United States Patent
Patel et al.

(10) Patent No.: US 9,292,175 B2
(45) Date of Patent: Mar. 22, 2016

(54) VENDOR WEBSITE GUI FOR MARKETING GREETING CARDS

(71) Applicant: Minted LLC, San Francisco, CA (US)

(72) Inventors: Namrata Patel, San Francisco, CA (US); Sean Belling, Oakland, CA (US); Erica Meade, Berkeley, CA (US); Wesley Tanaka, Honolulu, HI (US); Adrian Bravo, San Francisco, CA (US); Mariam B. Naficy, San Francisco, CA (US)

(73) Assignee: Minted, LLC, San Francisco, CA (US)

( * ) Notice: Subject to any disclaimer, the term of this patent is extended or adjusted under 35 U.S.C. 154(b) by 33 days.

(21) Appl. No.: 14/203,909

(22) Filed: Mar. 11, 2014

(65) Prior Publication Data

US 2015/0135127 A1 May 14, 2015

Related U.S. Application Data (60) Provisional application No. 61/901,484, filed on Nov. 8, 2013.

(51) Int. Cl.
| | |
|---|---|
| *G06F 3/00* | (2006.01) |
| *G06F 3/048* | (2013.01) |
| *G06F 3/0482* | (2013.01) |
| *G06F 3/0484* | (2013.01) |
| *G06Q 30/06* | (2012.01) |
| *G06F 3/0481* | (2013.01) |
| *G06F 3/0483* | (2013.01) |

(52) U.S. Cl.
CPC ............ *G06F 3/0482* (2013.01); *G06F 3/0483* (2013.01); *G06F 3/04817* (2013.01); *G06F 3/04842* (2013.01); *G06F 3/04845* (2013.01); *G06Q 30/0621* (2013.01); *G06Q 30/0641* (2013.01)

(58) Field of Classification Search
None
See application file for complete search history.

(56) References Cited

U.S. PATENT DOCUMENTS

| | | |
|---|---|---|
| D422,583 S | 4/2000 | Herceg et al. |
| 6,665,587 B2 | 12/2003 | Leone, III |
| 6,704,120 B1 | 3/2004 | Leone, III |
| 7,016,869 B1 | 3/2006 | Haeberli |
| 7,366,721 B1 | 4/2008 | Bennett |
| 7,469,380 B2 | 12/2008 | Wessling |
| D610,161 S | 2/2010 | Matas |
| D619,146 S | 7/2010 | Flik et al. |
| D620,023 S | 7/2010 | Flik et al. |

(Continued)

OTHER PUBLICATIONS

Guidelines and checklist for toggle switches, Mar. 3, 2012, 2 pages.

*Primary Examiner* — Yongjia Pan
(74) *Attorney, Agent, or Firm* — Jones Day (57) ABSTRACT

A system stores, in a database, different stock templates and also, for each stock template, a stock image to be displayed with the template. The system receives a user-designated image. The system then displays items simultaneously. Each item incorporates a different one of the stock templates along with the respective template's stock image. The system provides an image selector that is in a first position and capable of being switched by a user to a second position. Each time the user switches the selector to the second position, the system transforms the images in the displayed items simultaneously to the user-designated image. Each time the user switches the selector to the first position, the system transforms the images in the displayed items simultaneously to the items' respective stock images.

5 Claims, 5 Drawing Sheets

(56) References Cited

U.S. PATENT DOCUMENTS

| | | | |
|---|---|---|---|
| D624,935 S | 10/2010 | Umezawa | |
| D625,326 S | 10/2010 | Allen | |
| D629,010 S | 12/2010 | O'Donnell et al. | |
| D629,811 S | 12/2010 | Lee | |
| D633,917 S | 3/2011 | Poling et al. | |
| D635,989 S | 4/2011 | Bright et al. | |
| D638,439 S | 5/2011 | Cavanaugh et al. | |
| D645,878 S | 9/2011 | Cavanaugh et al. | |
| D647,911 S | 11/2011 | Allen et al. | |
| 8,073,285 B2 | 12/2011 | Curtis | |
| D669,906 S | 10/2012 | Cranfill et al. | |
| 8,302,033 B2 | 10/2012 | Matas et al. | |
| D670,713 S | 11/2012 | Cranfill et al. | |
| D670,716 S | 11/2012 | Majeed et al. | |
| 8,422,794 B2 | 4/2013 | Ptucha | |
| D700,191 S | 2/2014 | Faenza et al. | |
| 8,743,411 B2* | 6/2014 | Bachman | G06T 1/00 358/1.15 |
| 8,958,662 B1 | 2/2015 | Grosz | |
| 2003/0189602 A1 | 10/2003 | Dalton | |
| 2005/0007382 A1 | 1/2005 | Schowtka | |
| 2005/0047684 A1 | 3/2005 | Baum | |
| 2005/0210413 A1 | 9/2005 | Quek | |
| 2005/0278625 A1 | 12/2005 | Wessling et al. | |
| 2006/0098112 A1 | 5/2006 | Kelly | |
| 2006/0209214 A1 | 9/2006 | Fader | |
| 2007/0064121 A1 | 3/2007 | Issa et al. | |
| 2008/0222560 A1 | 9/2008 | Harrison | |
| 2008/0313205 A1 | 12/2008 | Elgar | |
| 2009/0234707 A1 | 9/2009 | Perez | |
| 2009/0313538 A1 | 12/2009 | Kitada | |
| 2010/0026719 A1 | 2/2010 | Ozawa et al. | |
| 2010/0070916 A1 | 3/2010 | Lees et al. | |
| 2010/0138506 A1* | 6/2010 | Van | G06Q 30/02 709/206 |
| 2010/0175018 A1 | 7/2010 | Petschnigg et al. | |
| 2010/0299192 A1* | 11/2010 | Aslanian, Jr. | G06Q 10/107 705/14.5 |
| 2010/0318899 A1 | 12/2010 | Kitada | |
| 2011/0026835 A1 | 2/2011 | Ptucha | |
| 2011/0164042 A1 | 7/2011 | Chaudhri | |
| 2012/0018501 A1 | 1/2012 | Wilen | |
| 2012/0066613 A1* | 3/2012 | Berger | G06Q 30/01 715/751 |
| 2012/0223959 A1 | 9/2012 | Lengeling | |
| 2012/0276880 A1* | 11/2012 | Angorn | H04W 4/12 455/414.1 |
| 2012/0304052 A1 | 11/2012 | Tanaka | |
| 2013/0038546 A1 | 2/2013 | Mineo | |
| 2013/0117703 A1 | 5/2013 | Jang et al. | |
| 2013/0132887 A1 | 5/2013 | Amin | |
| 2013/0152006 A1 | 6/2013 | Jiang et al. | |
| 2013/0239057 A1 | 9/2013 | Ubillos | |
| 2014/0096013 A1 | 4/2014 | Grosz | |
| 2014/0143082 A1 | 5/2014 | Larson | |
| 2015/0007004 A1 | 1/2015 | Kendrick | |
| 2015/0199118 A1 | 7/2015 | Berger | |

* cited by examiner

VENDOR WEBSITE GUI FOR MARKETING GREETING CARDS

CROSS REFERENCE TO RELATED APPLICATION

This claims the benefit of U.S. Provisional Application No. 61/901,484, filed Nov. 8, 2013, hereby incorporated herein by reference.

TECHNICAL FIELD

This relates to a computer-based graphical user interface (GUI) for marketing design products to a customer on a website and enabling the customer to customize the design products. The design products may be, for example, art prints, business cards, posters, flyers, brochures, stationery, calendars, event invitations, personal journals, and greeting cards.

BACKGROUND

Vendors of greeting cards have websites that provide a graphical user interface (GUI) for marketing greeting cards. A customer uses the GUI to upload a photograph and select a greeting card template. The website combines the photograph with the template to yield a customized greeting card that the customer can purchase.

SUMMARY

A system stores, in a database, different stock templates and also, for each stock template, a stock image to be displayed with the template. The system receives a user-designated image. The system then displays items simultaneously. Each item incorporates a different one of the stock templates along with the respective template's stock image. The system provides an image selector that is in a first position and capable of being switched by the user to a second position. Each time a user switches the selector to the second position, the system transforms the images in the displayed items simultaneously to the user-designated image. Each time the user switches the selector to the first position, the system transforms the images in the displayed items simultaneously to the items' respective stock images.

In another example, the system displays greeting cards simultaneously, each card incorporating a different one of the stock templates along with the respective stock text. The system receives user entry of a first user-designated text, and replaces the stock texts in all the displayed cards simultaneously with the first user-designated text. The system then receives user entry of a second user-designated text, and replaces the first user-designated text in all the displayed cards simultaneously with the second user-designated text.

In yet another example, the system displays, on a display screen, a front view of a card for sale. The front view includes a front plan view in which a front surface of the card appears to be parallel with a front surface of the screen. The front view further includes the card being portrayed on the screen as rotating oscillatorily while remaining less than 90 degrees from the front plan view

DETAILED DESCRIPTION

A graphical user interface (GUI) is used for selecting and customizing products that are decorated with an ornamental design. The GUI displays product items, with different candidate design templates, to a user such as a potential customer. The user uses the GUI to customize the designs of the displayed product items, to select one of the items, and to purchase a product with the customized design.

The product items may be, for example, art prints, business cards, posters, flyers, brochures, stationery, calendars, event (e.g., wedding and party) invitations, personal journals (with a decorative cover and blank inner pages for writing in), and greeting cards. These design products typically comprise printed paper medium and have a utilitarian function, such as providing information (e.g., regarding a contact, a scheduled event and personal notes). In this example, the products are greeting cards.

Figure 1:
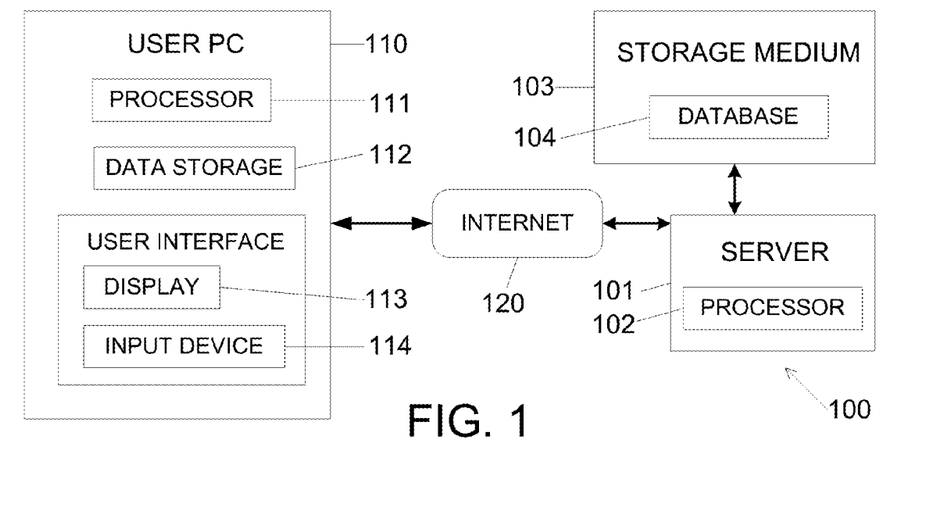
FIG. 1 is a block diagram of an example system for customizing and selecting greeting cards.

FIG. 1 is a block diagram of an example system 100 for implementing the website. The system includes a non-transitory hardware server 101 that has at least one processor 102. The processor executes program instructions of software code. The code is stored on a non-transitory hardware computer readable data storage medium 103 such as a computer hard drive device, to implement the GUI. In this example, the server hosts a website, associated with a greeting card vendor (merchant), that provides the GUI.

Besides storing the software code, the storage medium includes a database 104 that stores images and text provided by the user. The database 104 also stores design templates and data relating to each template. For each template, the data includes features such as a stock image set (one or more stock images to be included in the template), different possible stock greetings (text heading on a card's front indicating the primary subject or purpose of the card), different possible stock messages (sentences following the greeting), and different stock colors to accompany the template. For each template, the data further includes different rankings that differ from each other in terms of which statistical method the respective ranking was derived with (such as whether derived from popularity analysis and or machine learning) and that differ from each other in terms of the sampled population (e.g., whether the population comprises all customers or is specific to a demographic group or to a geographic area or to the current customer requesting a search).

The database 104 also stores information about ancillary merchandise items. Ancillary merchandise items are products that are not what the user is searching for. In this example, where the user is searching for greeting cards, example ancillary items are typically print-on-paper items such as business cards, posters, flyers, brochures, stationery, calendars, event invitations, and personal journals. Examples of ancillary items that are not print-on-paper are stationery-related products (e.g., pens and rulers) and non-stationery-related products (e.g., clothing items imprinted with images and text).

The GUI is provided on a user's computing device 110. Examples of user computing devices are a personal computer (PC) and a mobile communication device such as a smart phone. Each user device has a processor 111 and a data storage medium 112. It also has a user interface that includes a display screen 113 and a user input device 114. The input device 114 may include a mouse, a keypad and a touch-screen for inputting user entries. The user device may communicate through a network such as the Internet 120 with the web server 101 that implements the website GUI. Alternatively, some or all of the software code for implementing the GUI may be stored in the data storage medium 112 of the user device 110 and executed by the user device's processor 111, such that a server or network connection is unnecessary.

Figure 2:
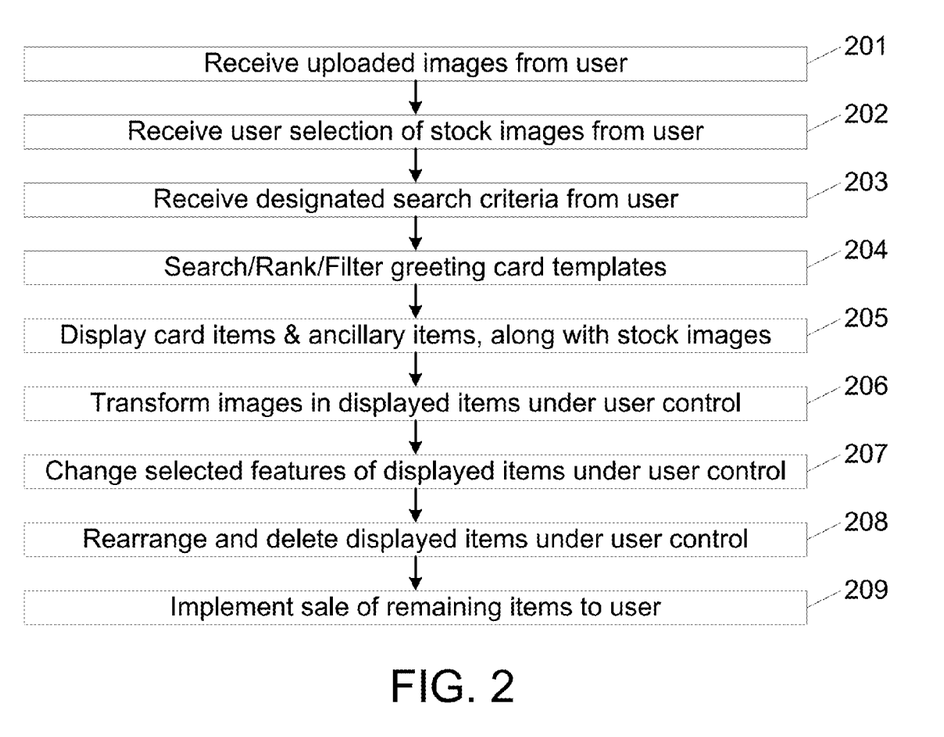
FIG. 2 is a flow chart of a method implemented by the system of FIG. 1 for customizing and selecting greeting cards.

FIG. 2 is a flow chart of an example method for implementing the GUI. In the method, the user uses the GUI to upload images 201, selects stock images 202, and designate search criteria 203. Based on the search criteria, the server searches items in its database, ranks them, and filters them 204, and displays them 205. The user uses the GUI to transform images in the items 206, change the items' features 207, rearrange them and delete some of them 208, and purchase the displayed items that remain on the display 209.

Figure 3:
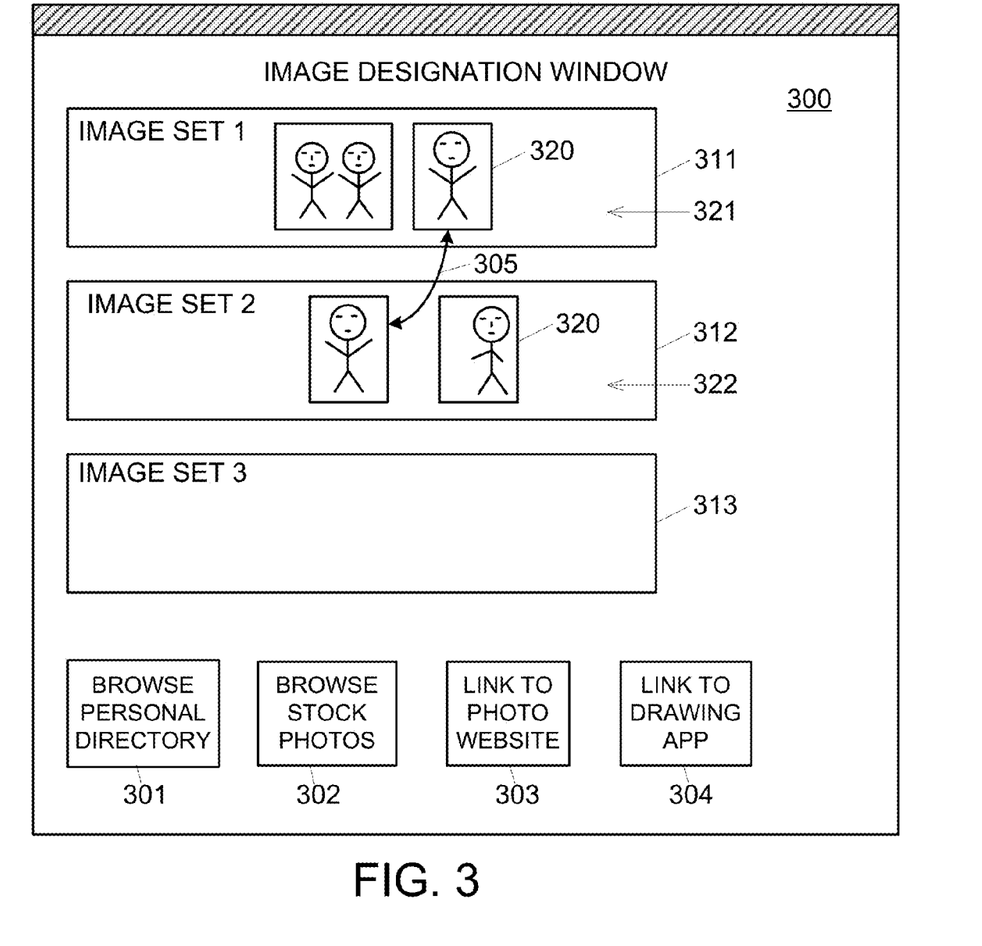
FIG. 3 is an image designation window with which a user designates one or more images.

FIG. 3 shows an example image designation window 300 of the GUI. It is used by the user to designate images (e.g., photos) to be inserted in the greeting card templates. Clicking on a "Browse Personal Directory" icon 301 in the window 300 accesses the user's computer directory, from which the user may select one or more images to upload to the website server. Clicking on a "Browse Stock Images" icon 302 in the window 300 causes the GUI to display a variety of stock images (e.g., photos) that are stored in the server, from which the user may select one or more stock images. Clicking on an external-website link 303 in the window 300 opens another website that has images, such as a website that holds the user's personal photographs, for the user to import images from the other website into the image designation window 300 of the present website. Similarly, the other website may have a link to the present image designation window 300 to export images from the other website to the present image designation window 300. Clicking on an image application link 304 opens an image-containing and image-generating application on the user's own device, from which images can be imported. The user may also copy-and-paste images from other websites, or from other applications on the user's device, into the window 300. The user may also drag-and-drop images from other websites or other applications into the window 300.

The images 320 that are imported into the image designation window 300 (in the various ways described above) together comprise "user-designated" images. The user may drag the user-designated images 320 to distribute them into one or more image set boxes 311, 312, 313 in the image designation window 300. In this example, the first image set box 311 contains a first image set 321, the second image set box 312 contains a second image set 322, and the third image set box 313 has not yet received any images from the user. In each designated image box 311, 312, 313, the user may also delete images, duplicate images, rearrange their order, and drag 305 them to another image set box.

The user may use software application features of the GUI to provide color adjustment, red-eye correction, transformation into sepia or black-and-white, cropping, rotation, aspect ratio adjustment, and other image processing operations. Some or all of the image processing can, alternatively, be done by the server without user input.

Figure 4:
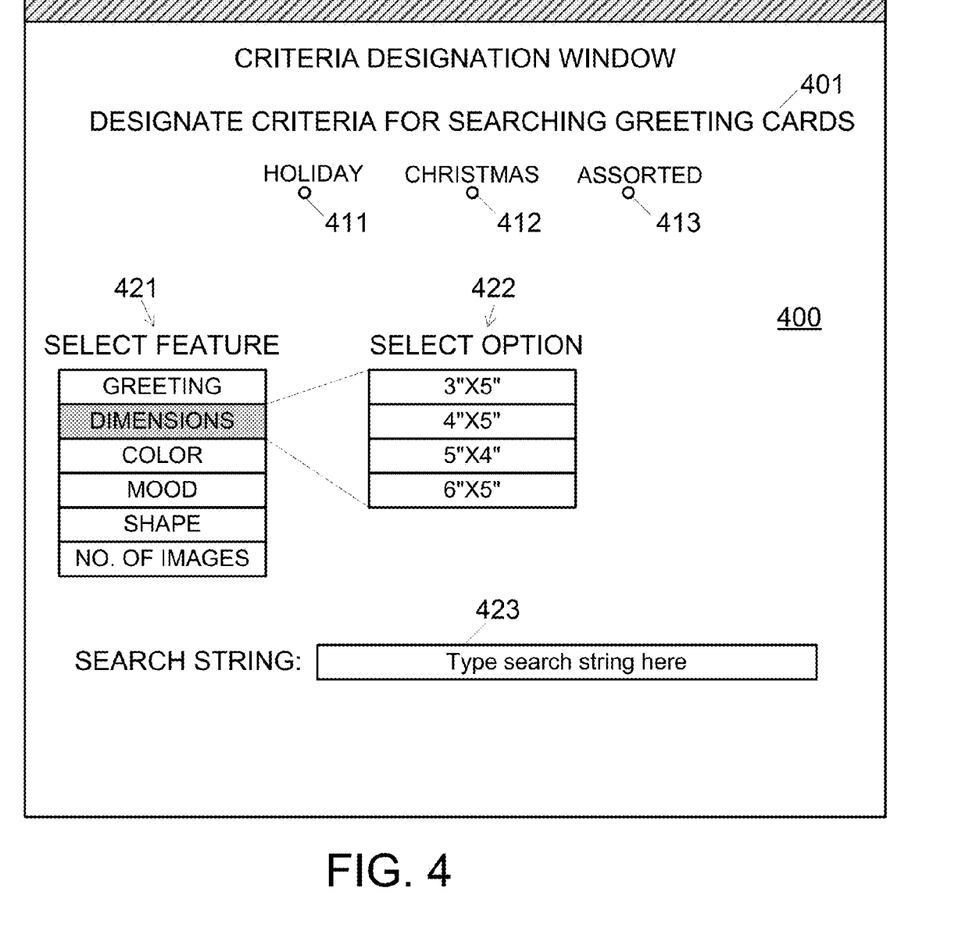
FIG. 4 is a criteria designation window with which a user designates criteria for searching greeting card templates in a database.

FIG. 4 shows an example criteria designation window 400 for the user to designate criteria that the program will use to search, rank and filter the database's stock images. The window 400 displays an indication 401 to the user that the following search will be for "greeting cards". The window 400 displays virtual buttons 411, 412, 413, each assigned a different category name (Christmas, etc.), to be clicked on to select the respective category. Category names can, for example, specify a holiday (e.g., Christmas), life event (e.g., birthday), design style (e.g., classical or modern), mood (e.g., funny, thoughtful), text font, card color, card-structure (e.g., single-fold, foil laminated) or card dimensions (height and width).

Additionally or alternatively, the criteria designation window 400 may include a dropdown feature selection menu 421 displaying a list of card features (e.g., greeting, dimensions, color, mood, peripheral shape, number of images, font, structure and style). When the user selects one of the features, a "Select Option" dropdown menu 422 displays a list of category options relating to the selected feature, for the user to choose from. For example, selecting the "Greeting" feature might yield the options "Merry Christmas", "Happy Birthday" and "Type your greeting here". Selecting a "Message" feature might yield different suggested messages, along with "Type your message here". Selecting a "Color" feature might yield different suggested colors, or color combinations (e.g., "red & green") or a non-color term (e.g., "American flag" or "Christmas") that is associated with colors for the card to have (such as red, white and blue for flag, and green and red for Christmas).

The criteria designation window 400 also displays a "Search String" field 423 for typing a search string. The search string may be, for example, a server-designated category like the categories listed above. Or the search string may be a term that is not a category, such as a greeting phrase to be compared to the stock greetings. Or the search string may be a key word to be compared to key words assigned in the database to each template.

The server 101 (FIG. 1) searches the stock templates in its database 102 for templates that match the user-designated search criteria and ranks the templates for closeness of match. The server also filters (narrows) the full database of templates down to a displayable number, in this case nine, of templates that best match the user's criteria. The displayable number may be designated by the user in the criteria designation window 400. Or the displayable number may be mathematically determined by the server based on data regarding the particular user and results of the search. The ranking and filtering may include preferring templates whose space for containing the greeting and message best matches the length of the user-designated greeting and user-designated message or whose style matches a mood indicated by wording of the user-designated greeting and user-designated message. The ranking and filtering may be further based on features of the user-designated image or images, such as the image's shape, size, aspect ratio (height to width), style, color range (e.g., large color variety, small color variety, just black-and-white), color palette (e.g., which colors included), art-type (e.g., whether line drawing, painting or photograph), how cluttered (e.g., finely detailed or bare), type of main feature (e.g., whether people, things or landscape), and number of selected photos to include in the card.

The same ranking and filtering scheme used for determining the most closely matching greeting cards may be used to determine a predetermined number, in this case three, of the ancillary merchandise items from the database 102 that most closely match the user-designated criteria.

Figure 5:
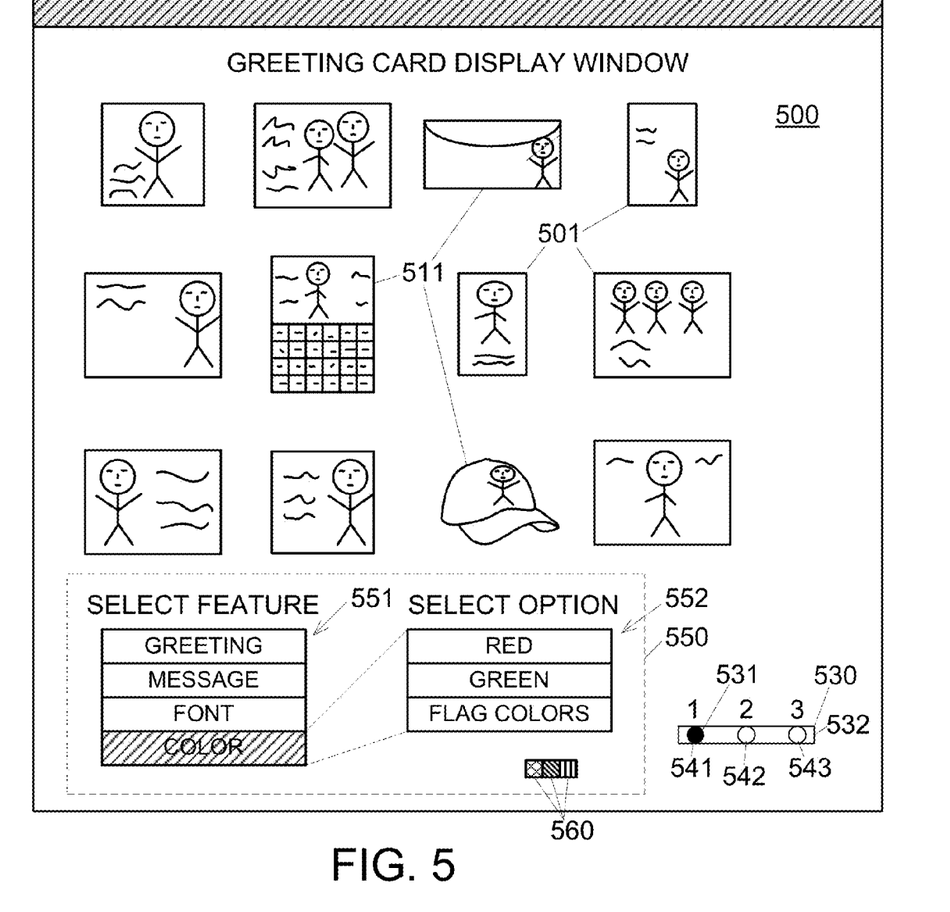
FIG. 5 is a greeting card display window for displaying (i) greeting cards that include templates found in the search and (ii) menus with which a user modifies the displayed cards.

FIG. 5 shows an example card display window 500 that displays the nine greeting cards 501 that incorporate the best matching templates. Each template is displayed along with its stock images, of which there may be zero, one or more stock images. Since each template may be assigned multiple alternative feature options (e.g., different stock greetings, stock messages and stock colors), the server selects the stock feature for each template that best matches the search criteria. The three server-selected ancillary items 511 (in this example an envelope, calendar and cap) are also displayed.

The 12 displayed items—nine greeting cards 501 and three ancillary products 511—are arranged in the window 500 in an array (matrix) whose dimensions (number of rows R and number of columns C) are determined by the server to best match the number and shapes of displayed items. R and C are preferably at least two, and are respectively three and four in this example. Each card's location on the array may be based on one or more of its ranking values.

The ancillary items 511 occupy locations (positions) of the array that are interspersed among the cards 501. The interspersing may be achieved by, for example, the following features: At least one, and preferably all, of the ancillary items 511 has at least two, and preferably at least three, and more preferably at least four vertically-neighboring and horizontally-neighboring locations occupied by a greeting card 501. For some or all of the ancillary items 511, no two ancillary items are in vertically-neighboring or horizontally-neighboring or diagonally-neighboring array locations. This arrangement of ancillary items 511 being intermingled with, and on the same array grid as, the greeting cards 501 helps give the user an impression that the ancillary items 511 are part of the search results for the user-requested search, as opposed to merely advertisements unrelated to the user-requested search.

The GUI includes an image selector 530, to be actuated with the input device 114 (FIG. 1) for transforming the images in the cards. In this example, the selector 530 includes a virtual slider button 531 that can be grabbed with the mouse or finger (if touch screen) and slid along a horizontal virtual track 532. The selector 530 has a finite number of button positions that equals the total number of available image sets, which itself equals the number of user-designated image sets (in this case two: 321 and 322 in FIG. 3) plus the stock image set that the cards 501 are initially displayed with. So, in this example, the selector 530 has three positions 541, 542, 543. The button 531 is initially in a fully left "first" position 541 ("1") when the image set in each card is the respective stock image set. Movement of the button 531 rightward, in a "forward" (rightward) direction to a "second" position 542 ("2") causes the images in each card 501 to undergo a first forward transformation (transition) to the first user-designated image set 321 (FIG. 3). Movement of the button 531 further "forward" (rightward) to a "third" position 543 ("3") causes the images in each card 501 to undergo a second forward transformation to the second user-designated image set 322 (FIG. 3). If a card 501 has more image spaces to fill than there are user-designated images in the respective image set, remaining spaces in the card will be left blank instead of retaining their stock images.

The displayed ancillary items 511 can, like the displayed cards 501, have spaces that initially hold stock images. Those stock images in the ancillary items can, as in the cards, be replaced with the first image set 321 (FIG. 3) during the first forward transformation and replaced with the second image set 322 (FIG. 3) during the second forward transformation. This reinforces the impression to the user that the ancillary items 511 are associated with, belong with, and therefore should be purchased with, the cards 501.

Movement of the slider button 531 in a reverse (leftward) direction from the "3" position to the "2" position causes the second user-designated image set 322 in each item 501, 511 to undergo a reverse transformation to be replaced with the first user-designated image set 321. Further movement of the slider button 531 in the reverse direction to the "1" position causes the first user-designated image set 321 in each item 501, 511 to be replaced by the initial stock images.

In each forward and reverse transformation, all items 501, 511 are transformed simultaneously. Each transformation is gradual, such that the user can perceive each prior image gradually disappearing while being gradually replaced with the next image. Progress in each transformation corresponds to the position of the slider button 531. For example, a transformation of all items' images is X % complete when the button 531 is X % of the way from its previous position to its next position. Accordingly, the rate of forward or reverse transformation is proportional respectively to the speed of forward or reverse movement of the button 531. Further accordingly, the user can cause a transformation to progress only halfway (without reaching the next image set) and then return to the previous image set, by moving the button 531 only halfway from a previous position to the next position and then returning the button 531 to the previous position. Alternatively, the rate of each transformation may be predetermined to occur gradually over the course of a set time (e.g., half a second), independent of speed of the button's movement.

Operation of this selector 530 provides user control of the transformation process, which is amusing to the user and gives the user the impression of being in control of the design customization. It also helps the user appreciate how well his/her designated image set 321 goes with each item 501. It also facilitates a comparison of how well a user-designated image 321 goes with each item 501, 511 relative to the stock image that the item designer considered optimal for that item. It also facilitates comparison of how well one user-designated image set 321 goes with each item 501, 511 relative to another user-designated image set 322 that the user him/herself previously considered optimal for that item.

Alternatives for the image selector 530 are as follows: The image selector may be one or more hardware or virtual keyboard keys, such as by pressing a right carrot key (>) to trigger each successive forward transformation and pressing a left carrot key (<) to trigger each successive reverse transformation. Alternatively, the GUI feature that causes the transformations may be movement of a cursor along a virtual stationary track, without showing any button, in a forward direction to cause a forward transformation and in a reverse direction to cause a reverse transformation. Alternatively, a user can select (such as by clicking or touching) one of the image boxes 311, 312 to cause all of that box's images to replace the images in all displayed items simultaneously. Alternatively, the forward transformation may occur automatically, soon after the items 501, 511 are displayed, and not be triggered by user input.

In a variation from the above example where all templates are initially displayed with their respective stock images, one or more of the templates can be initially displayed with the user-designated images. Cards embodying the template designer's image picks are thus intermingled with cards embodying the user's image picks. This gives the user a feeling that he/she is working in conjunction with the templates' professional designers, and that the user's work product is on par with that of professional designers.

Even after the image transformations have occurred, the user can add images to and delete images from the image set boxes 311, 312, 313. The user can also drag 305 (FIG. 3) images 320 from one box 311, 312, 313 to another and re-order images within a box. All displayed items 501, 511 will then be immediately transformed simultaneously in accordance with rearrangement of the images in the relevant box. Each item will be transformed such that the item's N images will be replaced with first N images from the relevant box 311, 312, 313, with the sequence the images appear in each item 501, 511 matching the sequence the images 320 appear in the box, and with all transformations occurring to all the items 501, 511 simultaneously.

While the items 501, 511 are displayed, the user can apply changes to all items 501, 511 using a feature-modification section 550 of the card display window 500 as follows: The user can open a dropdown feature-selection window 551 displaying a list of features (e.g., greeting, message, font, color). When the user selects one of the features, a feature-options dropdown menu 552 displays a list of options relating to the selected feature for the user to choose from. For example, if the user selects the "Greeting" feature, the option list can be "Merry Christmas", "Thank You", "Happy Birthday" and "Type your greeting here". When an option is selected, such as the user typing a greeting in the "Type your greeting here" option, each item's greeting changes to the selected greeting for all displayed items 501, 511 simultaneously. If the user selects the "Color" feature, the option list 552 may be, for example, "Red", "Green" and "Type a color here". Or, the GUI may display a color wheel from which the user can select a color. The color selection may affect color or color tint of background or text or image, in either a user image or stock image for all items simultaneously. The "Options" menu 552 for the "Color" feature might also include a non-color term (e.g., "American flag" or "Christmas") that is associated with colors for the card to have (such as red, white and blue for flag, and green and red for Christmas).

Additionally or alternatively, the feature modification section 550 may include a color selector comprising squares 560 of different colors. Selecting (e.g., clicking or touching) a square applies that square's color to all displayed items 501, 511.

A list of features (e.g., greeting, font, background, image) may appear beside the colored squares 560 for the user to select which of the cards' feature the selected square's color will be applied to. Alternatively, the server 101 (FIG. 1) may designate, individually and independently for each item 501, 511, which feature the user-selected color should be applied to, so that the color is applied to different features (e.g., greeting, background, image) in different cards. This determination by the server 101 may be based on an algorithm or rules formulated for each card template individually, by the template's designer, based on what features the designer considers, from artistic considerations, are most suitable for color change. So, as an example, if red is selected, the greeting of only some cards is reddened, the background of only some other cards is reddened, and the user-selected image of only some other cards is reddened.

The feature change may occur gradually, so that the user can perceive a previous greeting gradually disappearing while being gradually replaced with the new greeting.

The feature modification section 550 may appear continuously in the item display window 500 or may appear in a pop-up dialog window (not shown) so as not to take up space in the item display window 500 when not used.

Like the image transformations, any feature change applied to the displayed cards 501 may be concurrently applied to the displayed ancillary items 511. For example, if an ancillary item 511 is an envelope, calendar, or cap, its features (e.g., greeting, color) may be changed simultaneously with the changes in corresponding features in the displayed cards 501. Having the ancillary items 511 change simultaneously with and in agreement with the changes in the cards 501 gives the user an impression that the ancillary items 511 are associated with and belong with the cards 501 and should therefore be purchased along with the cards, even though the user was initially searching for only cards.

After the present web session ends and the user logs off from the website, the image sets 321, 322 are stored in the server's database 102 (FIG. 1) and associated with the user's account with the website. Those image sets 321, 322 will be displayed and available to the user when the user logs on to the website again, for the user to use in a subsequent session, unless and until the user deletes the images from the image sets 321, 322. Accordingly, the image sets 321, 321 remain available to the user from session to session.

The GUI enables the user, before or after image transformations and feature changes have been done, to drag the items 501, 511 to rearrange them on the array, which changes the positions of the items 501, 511 in the array. The rearrangement may be done, for example, to arrange the items in order of user preference.

The GUI also enables the user to delete items 501, 511 from the array, leaving only a subset of the previously displayed items. So, in this example, the initial set of nine cards 501 and three ancillary items 511 may be narrowed to only cards or to only ancillary items, or to one or two cards with one or two ancillary items. The set of items 501, 511 that have been thus rearranged and reduced in number can be then further modified (changed, transformed) by the user using the same changes and transformations explained above. The subset of items can be further narrowed by successively eliminating items from the array until even only one last item (either a card or an ancillary item) is left. And even that one last item may be modified by the user using the same image transformations and feature changes explained above for the initial set and subset.

Each time one or more items are eliminated from the array, the server may reconfigure the array dimensions based on the reduced number of items to be viewed. For example, the initial 3×4 (three row by four column) array to handle 12 items may be changed to 2×3 if only six items are left. Alternatively, since the user might keep track of each item based on that item's position, the GUI may keep retained items in their previous array positions as other items are deleted, leaving empty spaces where the deleted items previously were.

Each card is displayed in front plan view, in that the card's front surface appears to be parallel with the display screen's front surface and faces directly forward. Each displayed card is essentially only two dimensional. That is because each card's peripheral surfaces (i.e., top surface, bottom surface and two opposite side surfaces) have negligible thickness (essentially paper thin) and carry no information or design. So tilting a card (by computer animation) on the display screen 500 to display its peripheral surfaces to the user provides the user no useful information regarding the peripheral surfaces. However, tilting the card does provide the user information about its front surface, including a clearer understanding of the front surface's texture (e.g., fine or coarse), contour (e.g., if embossed and debossed sections, and especially if blind embossed and debossed), reflectivity and shine, and how it changes shade and brightness when reflecting light from different tilt angles. Tilting the card on the display screen 500 also gives the user a better feel and understanding of how the physical card will appear when in the hands of a recipient, since the card's design features (e.g., images, text and other motif lines) can give different impressions when viewed at different angles, which a front plan view might not convey. If a card has a laminate added to it, such as shiny foil, card rotation gives the viewer an idea of the thickness of the foil, which a front plan view cannot convey.

Figure 6:
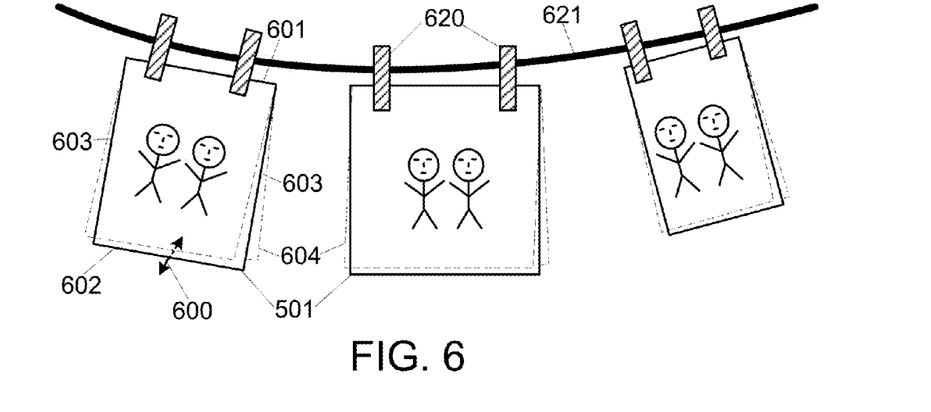
FIG. 6 shows an optional way of displaying the greeting cards in the card display window, in which the cards are portrayed as swinging from a ribbon.

Accordingly, as shown in FIG. 6, the GUI implements computer animation to portray each card 501 as rotating (tilting, swinging) oscillatorily (in an oscillating manner back and forth). This rotation is indicated by double-headed arrow 600 and dashed lines 604 suggesting forward and rearward swinging of each card. This rotation may be about a horizontal axis that reveals the card's top and bottom surfaces 601, 602 or about a vertical axis that reveals the card's side surfaces 603. Or the rotation may be about both horizontal and vertical axes or about a diagonal axis (neither horizontal nor vertical) that gives a perspective view showing all four peripheral surfaces. The rotational axis may be on the card so that one section of the card swings toward the viewer while another section of the card swings away from the viewer. Or the rotational axis may be above or below or alongside the card such that all sections of the card swing toward the viewer at the same time, and swing away from the viewer at the same time. The card 501 may rotate continuously in one direction to make multiple full 360 degree rotations in one direction, or may rotate oscillatorily. If rotating oscillatorily, the card may remain less than 90 degrees from front plan view, so that its back surface remains unseen, and preferably less than 15 degrees from front plan view. The rotation may appear to be systematic with uniform frequency and amplitude. Or the rotation may appear random and haphazard with varying speed and varying amplitude as if caused by the wind.

The GUI may portray the cards 501 as levitated in air without support (as in FIG. 5), or suspended by some suspending device. In FIG. 6, for example, the cards 501 are suspended by clothespins 620 from a ribbon 621, and appear to be swinging forward and backward. They may also appear to be swinging at different frequencies and amplitudes and out of phase from each other, which gives the impression they are swinging due to wind and inertia. In the example of FIG. 6, the rotational axis for each card 501 is along the ribbon above the cards. Since the ribbon is bowed, the rotational axis is at a different angle (relative to horizontal) for each card. To enhance the appearance of realism, the cards' top edges 601 are neither parallel to each other nor perfectly horizontal, due to the ribbon's bow and the cards are suspended by the clothespins 620 in an imprecise way.

All the cards 501 may appear to move, as described above, continuously. Alternatively, each card 501 may initially be stationary and start moving only when it is selected (e.g., clicked or touched) by the user. This simulates the card being disturbed by the user's touch. Once started, the movement may gradually decrease (dampen), reaching a full stop by perhaps 2-4 seconds as an actual card would. Having the cards 501 remain stationary except when disturbed by the user may provide three advantages: 1) facilitates scrutiny of each card, 2) reduces mental distraction relative to having too many things continually moving, and 3) enhances realism.

The ancillary items 511 may rotate in the same manner as the cards 501, to reinforce the impression that the ancillary items 511 are associated with and belong with the cards 501.

Figure 7A:
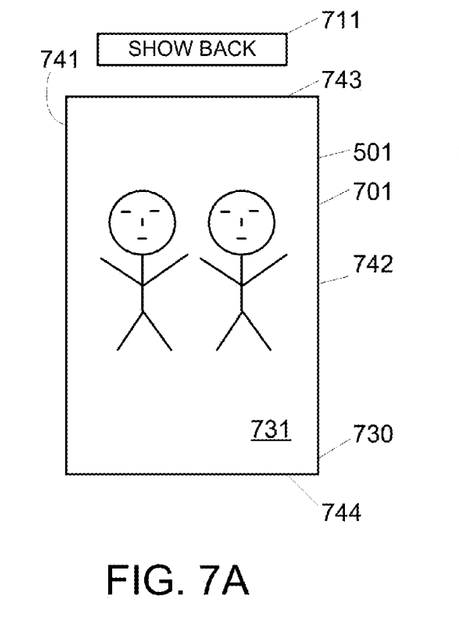
FIGS. 7A and 7B show an optional way of displaying the greeting cards in the card display window, respectively showing a flat view and a bent view of a displayed greeting card.

FIG. 7A is an expanded view of one of the displayed cards 501 of FIG. 5. The image 501 of the card in FIG. 7A is a front flat image 701 in that it shows a front surface 731 of the card lying flat. This flat image may transition through a forward transition into a bent view image 702 shown in FIG. 7B in response to a first trigger. The bent view image 702 may transition through a reverse transition back into the flat view image 701 in response to a second trigger.

The first trigger may comprise a selection (such as clicking or touching) by the input device 114 (FIG. 1) of an icon on the display window 500 (FIG. 1). The icon for the first trigger may be the phrase "SHOW BACK" 711 displayed above the first image 701, and the icon for the second trigger may be the phrase "HIDE BACK" 712 displayed above the second image 702. The triggers may alternatively be clicking or touching the card 501 itself or swiping across the card 501.

Figure 7B:
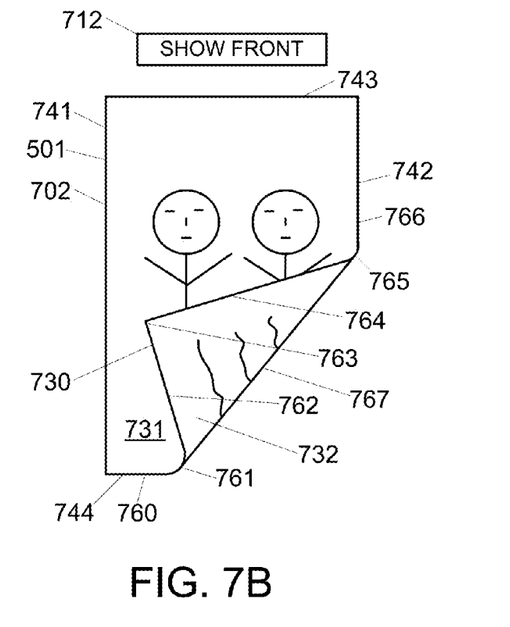

The flat and bent view images 701, 702 together comprise a transitional image that simulates an actual (physical, paper) card as follows: The flat image 701 has the same shape and appearance (in terms of peripheral shape and graphic content) as an actual card offered for sale, although it might differ in size. The bent image 702 has the same shape and appearance as the flat image 701, except for a lift tab section 730 that simulates a corner of the card being lifted away from the plane of the display screen and bent over so as to both cover (hide) only a portion of the front surface 731 of the card and expose (reveal) only a portion 732 of the rear surface of the card 501.

The card 501 has opposite first and second vertical edges 741, 742 and opposite first and second (top and bottom) horizontal edges 743, 744. The entire first vertical edge 741, the entire first horizontal edge 743, only a portion 760 of the second horizontal edge 744 and only a portion 766 of the second vertical edge 742 occupy the same pixels in the bent view 702 as they respectively do in the flat view 701.

The first transition (from the flat view 701 to the bent view 702) and the reverse transition (back to the flat view 701) may be instantaneous. Or they may be animated and gradual such that a viewer may perceive the lift tab section 730 appearing, over the course of a predetermined time (e.g., ⅓ second), to be lifted away from the plane of the screen 500 and over, to arrive at its position shown in the bent view 702. Being gradual helps the viewer understand the bent card view's relationship to the flat card view.

The lift tab section 730 in the bent view 702 of FIG. 7B, as it appears to the viewer, is bounded by a lower rounded edge 761, a somewhat vertical edge 762, an apex 763 (corner), a somewhat horizontal edge 764, an upper rounded edge 765, and a slanted line 767. The slanted line 767 extends from the upper rounded edge 765 to the lower rounded edge 761.

All graphic content, such as pictures and text, on the front surface 731 that is not covered by the lift tab 730 remains unchanged and unmoved when transitioning from the flat view 701 to the bent view 702 and back again. In other words, the output of each pixel of the card 501, that is not covered by the lift tab 730, is the same when in the bent view 702 as when in the flat view 701.

Although, in this example, the lift tab 730 is shown at the card's bottom right corner, the lift tab could equivalently be at the card's bottom left corner, top left corner or top right corner. If the user selects (e.g., clicks or touches) one corner of the card, that corner may be designated by the GUI as the corner to lift.

The user may then select the remaining items on the display window 500 for purchase. The user provides payment and delivery information to the server 101. The selected items are then delivered (provided) to the user.

The components and procedures described above provide examples of elements recited in the claims. They also provide examples of how a person of ordinary skill in the art can make and use the claimed invention. They are described here to provide enablement and best mode without imposing limitations that are not recited in the claims. In some instances in the above description, a term is followed by a substantially equivalent term enclosed in parentheses.

The invention claimed is:

1. A method comprising:
    displaying, by a display screen, a front view of a first card for sale, the front view including a front plan view in which a front surface of the first card appears to be parallel with a front surface of the screen and further including the first card being portrayed on the screen as rotating oscillatorily while remaining less than 90 degrees from the front plan view;
    receiving a trigger from the viewer indicating a request to view a rear surface of the first card;
    in response to receiving the trigger, transitioning from a flat view of the first card to a bent view of the first card in which a lift tab section of the first card is bent over to cover only a portion of the front surface and reveal only a portion of a rear surface of the first card;
    cause the display screen to display, simultaneously with the displaying of the first card, a front view of a second card for sale, the front view of the second card including a front plan view in which a front surface of the second card appears to be parallel with a front surface of the screen and further including the second card being portrayed on the screen as rotating oscillatorily while remaining less than 90 degrees from the front plan view, with the first card and the second card appearing to be rotating oscillatorily at different frequencies from each other and different amplitudes from each other and out of phrase from each other;
    wherein:
    the oscillatory rotating of the first card is about a vertical rotational axis that is on the first card, so that one section of the first card appears to rotate toward a viewer while another section of the first card appears to rotate away from the viewer;
    the oscillatory rotating of the first card appears to be with randomly varying speed and varying amplitude;
    the first card remains less than 15 degrees from the front plan view;
    the transitioning is gradual such that the viewer can perceive the lift tab section appearing to be lifted toward the viewer, and then over, to arrive at the lift tab's position in the bent view;
    the first card appears to be suspended by a suspending structure; and
    the displaying is implemented as part of a graphical user interface (GUI) of a vendor website of a merchant that sells cards, wherein instructions for implementing the GUI are received at the display screen over the Internet from a server that hosts the website;
    the first card and the second card initially appear to be stationary;
    the first card starts to oscillatorily rotate only when individually selected by the viewer; and
    the second card starts to oscillatorily rotate only when individually selected by the viewer.

2. The method of claim 1 wherein the first card has opposite first and second peripheral vertical edges and opposite first and second horizontal peripheral edges, and wherein (i) the entire first vertical edge, (ii) the entire first horizontal edge, (iii) only a portion of the second vertical edge and (iv) only a portion of the second horizontal edge occupy the same pixels in the bent view as they respectively do in the flat view.

3. The method of claim 1 wherein the rotating of the first card is about an axis that is on the first card, so that one section of the first card appears to swing toward a viewer while another section of the first card appears to swing away from the viewer.

4. The method of claim 1 wherein the oscillatory rotation of the first card gradually decreases until reaching a full stop.

5. A non-transitory computer readable medium storing software instructions configured to be executed by one or more processors to:
    cause a display screen to display a front view of a first card for sale, the front view including a front plan view in which a front surface of the first card appears to be parallel with a front surface of the screen and further including the first card being portrayed on the screen as rotating oscillatorily while remaining less than 90 degrees from the front plan view;
    receive a trigger from the viewer indicating a request to view a rear surface of the first card;
    in response to receiving the trigger, transition from a flat view of the first card to a bent view of the first card in which a lift tab section of the first card is bent over to cover only a portion of the front surface and reveal only a portion of a rear surface of the first card;
    cause the display screen to display, simultaneously with the displaying of the first card, a front view of a second card for sale, the front view of the second card including a front plan view in which a front surface of the second card appears to be parallel with a front surface of the screen and further including the second card being portrayed on the screen as rotating oscillatorily while remaining less than 90 degrees from the front plan view, with the first card and the second card appearing to be rotating oscillatorily at different frequencies from each other and different amplitudes from each other and out of phrase from each other;
    wherein:
    the oscillatory rotating of the first card is about a vertical rotational axis that is on the first card, so that one section of the first card appears to rotate toward a viewer while another section of the first card appears to rotate away from the viewer;
    the oscillatory rotating of the first card appears to be with randomly varying speed and varying amplitude;
    the first card remains less than 15 degrees from the front plan view;
    the transitioning is gradual such that the viewer can perceive the lift tab section appearing to be lifted toward the viewer, and then over, to arrive at the lift tab's position in the bent view;
    the first card appears to be suspended by a suspending structure; and
    the displaying is implemented as part of a graphical user interface (GUI) of a vendor website of a merchant that sells cards, wherein instructions for implementing the GUI are received at the display screen over the Internet from a server that hosts the website;
    the first card and the second card initially appear to be stationary;
    the first card starts to oscillatorily rotate only when individually selected by the viewer; and the second card starts to oscillatorily rotate only when individually selected by the viewer.

\* \* \* \* \*